UNITED STATES PATENT OFFICE.

ALLAN WADE DOW, OF WASHINGTON, DISTRICT OF COLUMBIA.

MANUFACTURE OF ASPHALTIC CEMENT.

SPECIFICATION forming part of Letters Patent No. 688,073, dated December 3, 1901.

Application filed December 1, 1900. Serial No. 38,342. (No specimens.)

*To all whom it may concern:*

Be it known that I, ALLAN WADE DOW, of Washington, in the District of Columbia, have invented certain new and useful Improvements in the Manufacture of Asphaltic Cement; and I hereby declare that the following is a full, clear, and exact description thereof, reference being had to the accompanying drawings, which form part of this specification.

This invention is an improvement in the manufacture of asphaltic cement; and its object is to produce a desirable and durable product from asphaltic oils or oils having asphaltic bases as distinguished from oils having paraffin bases which will be suitable for paving purposes and will be less affected by atmospheric changes than the artificial asphalts heretofore made from these oils have been.

It is known that when asphaltic oils are subjected to continuous distillation they are changed into bodies that when cold resemble the hard natural asphalts in appearance, but differ essentially therefrom in that when such bodies are softened by the addition of a suitable flux and used as a paving-cement such cement is much more susceptible to change in temperature than the cement made from the hard natural asphalts, so that practically the artificial asphalts heretofore made therefrom are useless for paving purposes. In treating the asphaltic oils to obtain my new product I produce an excessive cracking or molecular change by prolonged heating at temperatures of from 500° to 900° Fahrenheit or even more, accompanied by more or less distillation by any of the known processes of distilling or refining oils and continuing this heating until an asphaltic product is obtained that upon fluxing will make a paving-cement which will practically be as durable as, and, if desired, even less affected by changes in temperature than, the cements from the natural hard asphalts. The attaining of this product can readily be determined by taking samples of the heated product at intervals and softening it into a paving-cement of the desired consistency by the addition of a suitable flux, cooling same, and testing the resulting cements at different temperatures with a penetration-machine. This can be done from time to time until the product makes a cement having the desired properties—to wit, being not more or even less susceptible to change in temperature than cements made from natural hard asphalt. Any known method of testing this asphalt product and cement may be employed. The more severe and prolonged the heating of the asphalt oils up to a point where the molten mass begins to thicken at a temperature of about 700° Fahrenheit the less susceptible will be the resulting product to changes in temperature, and it is possible to produce products from which can be formed paving-cements superior to cements made from hard natural asphalts. When the heating has been continued sufficiently long, the resulting product will when cold be excessively brittle and can be easily crushed to powder between the teeth. When it reaches this condition, it may then be used as a substitute for the hard natural asphalt and the asphaltic cement made therefrom will be found to be as good as if not better than those made from the latter and to be equally or even better capable of withstanding changes in temperature and atmospheric changes. The process may be expedited by previously distilling the asphaltic oils, so as to remove more or less of the lighter oils and treating the residue as above stated.

The asphaltic product of my process is substantially insoluble in petroleum-naphtha. The known asphaltic products that are readily soluble in petroleum-naphtha would be wholly unfitted for paving purposes.

Preferably after the desired product is obtained, but before cooling the same, I mix therewith a suitable quantity of flux to render the resultant mixture when cool more readily fusible. If my product is permitted to cool without any flux, it is very hard and difficult to melt the same; but by mixing it with a less quantity of the flux than is necessary to fit it for paving purposes the mixture can be run off into suitable receptacles to be shipped, and when cooled will become sufficiently hard to be easily handled in such receptacles. In order to facilitate the thorough and proper admixture of the product and flux, it is preferable that the flux be heated before introducing the same into the product. This partially-fluxed product will be much more susceptible to heat, and therefore more easily and economically melted or reduced to condition for use in paving than the product would be if permitted to cool without the addition of any flux. Where it is convenient or desirable as soon as the tests show that the desired product has been obtained, I introduce into the hot fluid product refined asphaltic oil or maltha to flux the same and reduce it to the proper condition for immediate use for paving purposes. In this way great economy is realized in the manufacture of the pavement, since it is not necessary to reheat the product, as would otherwise be the case if it were manufactured at a distance from the point of use. This feature of adding the flux to my new product while the latter is hot I consider of great practical value, for if allowed to cool it would be very difficult to remelt the product without burning or coking it. After the operator has become sufficiently experienced he may be able to determine the proper time to introduce the flux without having to make the cold tests above referred to.

Having thus described my invention, what I claim as new, and desire to secure by Letters Patent of the United States, is—

1. The herein-described artificial paving-asphalt, consisting of the product obtained from oils having asphaltic bases by prolonged distillation thereof at temperatures sufficiently high to produce severe cracking, said product being substantially insoluble in petroleum-naphtha, combined with a suitable flux, spbstantially as herein set forth.

2. The herein-described process of treating oils having asphaltic bases, consisting in subjecting such oils to prolonged heating at high temperatures until a product is obtained which when cool is very friable and substantially insoluble in petroleum-naphtha, and mixing such product with a suitable flux to produce a cement not more susceptible to atmospheric changes than cements made from hard natural asphalt.

3. The herein-described process of treating oils having asphaltic bases for paving purposes, consisting in subjecting such oils to prolonged heating at high temperatures until a product is obtained which when cold will be hard and very friable, and introducing into the product a suitable flux, substantially as and for the purpose set forth.

4. The herein-described process of treating oils having asphaltic bases for paving purposes, consisting in subjecting the oil to prolonged heating at high temperatures until a product is obtained which if cooled will be hard, friable and substantially insoluble in petroleum-naphtha, and then introducing into such molten product before cooling a suitable flux to produce a cement for paving purposes, substantially as set forth.

In testimony that I claim the foregoing as my own I affix my signature in presence of two witnesses.

ALLAN WADE DOW.

In presence of—
ARTHUR G. DOWELL,
JAMES R. MANSFIELD.